Dec. 4, 1973

W. S. LITTLE, JR 3,776,995

METHOD OF PRODUCING X-RAY DIFFRACTION GRATING

Filed Oct. 15, 1970

2 Sheets-Sheet 1

INVENTOR.
WILLIAM S. LITTLE JR.
BY [signature]
ATTORNEY

Dec. 4, 1973 W. S. LITTLE, JR 3,776,995

METHOD OF PRODUCING X-RAY DIFFRACTION GRATING

Filed Oct. 15, 1970 2 Sheets-Sheet 2

United States Patent Office 3,776,995

Patented Dec. 4, 1973

3,776,995

METHOD OF PRODUCING X-RAY DIFFRACTION GRATING

William S. Little, Jr., Rochester, N.Y., assignor to Xerox Corporation, Stamford, Conn.

Filed Oct. 15, 1970, Ser. No. 80,865
The portion of the term of the patent subsequent to Mar. 21, 1989, has been disclaimed
Int. Cl. B29c *1/02*
U.S. Cl. 264—219 1 Claim

ABSTRACT OF THE DISCLOSURE

A method is herein disclosed for producing a high resolution X-ray diffraction grating having a relatively large working surface thereon. An optically worked glass substrate is coated with an even layer of photoresist material. The coated surface is then exposed to a pattern of light interference fringes and the pattern is scanned across the surface in a manner whereby the phase relationship between the interfering light beams remain unaltered at each point on the surface. The rate of scan is controlled to produce a uniform time average exposure of the fringes on the coated surface. The exposed surface is then developed by slectively removing the photoresist material from the glass support surface leaving behind a periodic array of extended parallel glass stripes separated by ridges of photosensitive material. The developed surface is next coated with a thin layer of glass adhering metal to form an inverse X-ray grating. A substrate coated with an unfixed epoxy resin is placed in pressure contact against the metallized surface of the work element and allowed to dry or harden while under pressure. The substrate is then removed from the master and forms an X-ray diffraction grating having a smooth unblemished surface thereon interrupted by equally spaced grooves that are determined by the positioning of the photosensitive ridges on the surface of the master.

CROSS REFERENCES

Pat. Nos. 3,650,604 and 3,650,605, filed concurrently herewith and issued to William S. Little, Jr., the applicant herein.

This invention relates to X-ray spectroscopy and, in particular, to a method of producing high resolution X-ray diffraction gratings.

Because of recent development in space research and the analysis of plasmas and the like, there has been an ever increasing demand for X-ray type diffraction gratings capable of operating at wavelengths considerably below 500 angstroms. However, industry has been unable to meet these demands primarily because most X-ray diffraction gratings are derived from mechanically ruled masters which do not satisfactorily deliver the accuracy required when operating in this particular range.

It is therefore an object of this invention to improve methods of producing X-ray diffraction gratings.

A still further object of this invention is to efficiently produce X-ray diffraction gratings of high resolution.

Yet another object of this invention is to eliminate the need for a mechanical ruled master in the production of an X-ray diffraction grating.

These and other objects of the present invention are attained by coating the surface of a smooth work element with a relatively uniform coating of photoresist material, exposing the coated surface to a pattern of light interference fringes, moving the light interference fringes beyond the boundary of the original pattern without disturbing the phase relationship between the interfering light beams so as to uniformly expose the coated surface, developing the coated surface of the work element to selectively remove the photoresist material from the light struck areas thus creating a periodic array of parallel smooth valleys separated by ridges of photosensitive material, depositing a uniform thin layer of metal over the developed surface of the work element and replicating the metallized surface of the work element to produce a grating comprised of a smooth unblemished surface interrupted by equally spaced parallel grooves. Alternately the surface of the grating can be coated or metallized to produce an extremely even highly reflective working surface.

For a better understanding of this invention as well as further objects and features thereof, reference is had to the following detailed description of the invention to be read in conjunction with the accompanying drawings, wherein.

Any small irregularities in the surface of a diffraction grating will scatter or diffuse irradiated light. When operating in the wavelength region below 500 angstroms, or in the X-ray region, the spectral lines can be completely obliterated. It is therefore essential that the working surface of an X-ray grating be smooth and free of any irregularities. A method is herein disclosed by which such a high resolution X-ray grating, that is, one having a smooth working surface, is efficiently produced without resorting to the use of mechanically ruled masters or the like that might blemish the surface of the grating.

Figure 1:
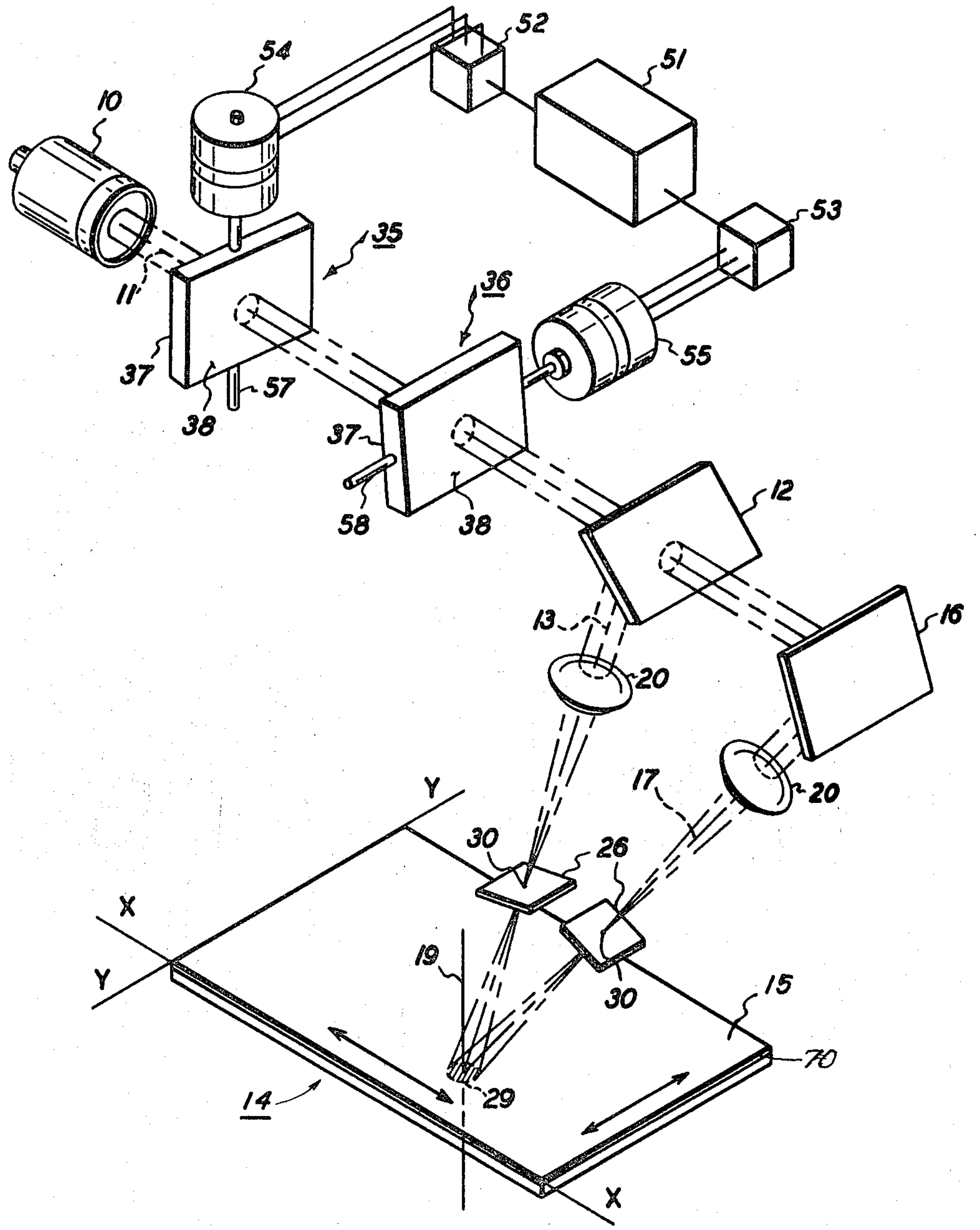
FIG. 1 is a schematic view in perspective of apparatus for optically exposing a work element in accordance with the teachings of the present invention.

Referring now specifically to FIG. 1, a point source of light energy 10 is arranged to direct a beam of highly coherent collimated light 11 incident upon a beam splitter 12 wherein a portion of the light energy is redirected along a first optical path 13 towards the work element 14, the top surface of which is positioned in a read-out plane 15 defined by the coordinates $(x)$ and $(y)$. A portion of the light energy is transmitted through the beam splitter and then redirected by means of a reflecting surface 16 along a second optical path 17 towards the work element. The beam splitter and the light reflecting surface are both arranged so that the two redirected light beams are superimposed in an interference pattern 29 located about an instantaneous optical center 19 at the plane described by the $(x)$ and $(y)$ coordinates.

Two identical projection lenses 20 are mounted in each of the optical light paths 13 and 17 associated with the redirected light beams. The lenses serve to both expand the original light image in the read-out plane and convert the original plane wave front of light energy entering the lens to a spherical wave front. The divided light beams are then recombined in the read-out plane and serve to produce an extremely stable interferrometric pattern in the manner of Fresnel's bi-prism or Young's double pin hole apparatus.

Any dust particles entering the system will diffract the collimated light and produce unwanted noise in the exposure pattern. A pair of spatial filters 26 are provided to minimize this noise. The filters are positioned in the back focal plane of each lens and have a clear aperture 30 formed therein being of a size sufficient to pass the focal spot of the associated lens.

The intensity distribution of the energy in a conventional laser beam normally is bell shaped, or Gaussian, in cross-section. A high precentage of this energy is concentrated about the center of the beam with the intensity falling off in all directions, away from the axis of the beam. Although the light energy undergoes a change in wave form as it passes through the system, the intensity distribution of the energy nevertheless remains unchanged so that the distribution in the exposure pattern is a direct reflection of that of the source and therefore non-uniform. In order to accomplish uniform exposure of a large work element without wasting a large percentage of the input energy, the exposure pattern is scanned in the read-out plane of the present apparatus. However, conventional scanning methods cannot be used in the present invention because these techniques generally result in the fringes being moved with respect to their original positions on the surface. This obliterates stationary fringe pattern that is required to expose the photoresist material.

Means are herein provided for exposing the working surface of the work element 14 supported in plane 15 (FIG. 1) to a translating intensity pattern whereby the positions of the interfering fringes remain unaltered. Movement of the fringe pattern in the read-out plane is accomplished by means of a pair of transparent plates 35, 36, preferably constructed of glass, that are rotatably supported in the original laser beam 11 at some point between the light source and the beam splitter. Although not necessary for the practice of the present invention, the axis of rotation of the individual glass plates is shown passing near the optical center line of the original laser beam.

Figure 2:
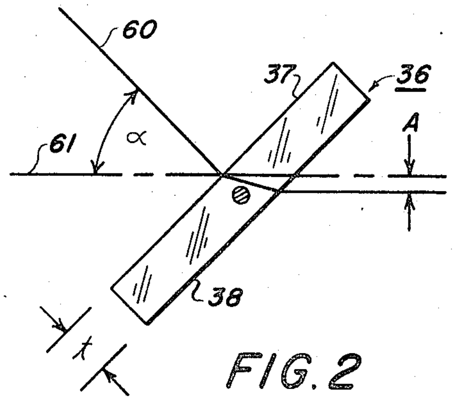
FIG. 2 is a side view of a control plate for regulating the displacement of the illumination pattern of interfering light fringes in the plane of the work element as illustrated in FIG. 1.

Each plate is prepared having a light receiving surface 37 and a light exit surface 38 that are substantially flat and are parallel in relation to each other. When the plates are positioned with the light receiving surface normal to the original laser beam, the light rays travel in a straight line from a source to the beam splitter. However, obliquely repositioning either of the plates within the beam causes the beam to be laterally displaced. As illustrated in FIG. 2, a single ray of light passing through the plate behaves at the interfaces in accordance with Snell's law and, because of the light entrance face is parallel to the light exit face, the existing beam is also parallel to the entering beam. However, it will be noted that the existing light beam is displaced some distance A from the entering beam; the distance being dependent on the thickness ($t$) of the plate and the angle of incidence $\alpha$ at which the beam strikes the entrance face. It has been found, that when the original light beam is displaced in the manner herein described, the illuminated interference pattern is translated in the read-out plane without disturbing the precise locations of the interference fringe lines.

A test was conducted employing apparatus similar to that herein described in which a snigle ¼ inch thick glass plate was repositionably supported in the output beam of a laser. The outer edges of the plate were masked with an opaque tape and the flat parallel light-receiving and light-exit faces rotated through the laser beam at approximately 180 r.p.m. In this manner, the illuminated fringe pattern was continually translated across the read-out plane. A portion of the read-out plane was observed under a 500× microscope revealing that the fringe pattern, that is, the light and dark fringes in the observed region, was extremely stable. No changes were discernible in the locations of the light and dark fringes. The bright fringes remained in a stationary position and only the level of intensity of these particular fringes changed as the illuminated exposure pattern was translated across the observed region.

The positioning of the individual light transmitting plates 35 and 36 is controlled through means of a programming network consisting of a digital computer 51, a pair of pulse generators 52 and 53, and reversible stepping motors 54 and 55. Plates 35 and 36 are rotatably supported upon segmented shafts 57, 58, respectively, and the shafts directly coupled to the associated stepping motors as shown in FIG. 1. Plate 36 serves to control the horizontal movement of the illumination pattern in the ($x$) direction of the read-out plane while plate 35 is arranged to control the pattern in the ($y$) direction. In operation, a predetermined motion is imparted to the horizontal control plate 36 by the previously described control network whereby the light entrance face 37 is rotated through the entering light beam over a predetermined path of travel.

In practice, the normal 60 (FIG. 2) to the light entrance surface is generally moved approximately 45° to either side of the optical center line 61 of the entering light beam by means of the reversible stepping motor 55. As the light entrance face of the plate 36 is swept back and forth over the prescribed path of travel, the exposure pattern in the read-out plane is caused to sweep back and forth in the ($x$) direction. However, after the completion of each horizontal sweep, and before the direction of the sweep is reversed, the vertical control plate 35 is repositioned in regard to the entering light beam by means of the associated stepping motor 54. The illumination pattern on the return sweep is caused to traverse a path of travel substantially parallel to, but offset from, the subsequent sweep so that the exposure pattern is translated across the entire surface of the work element.

The work element 14 positioned in the read-out plane of the present apparatus comprises a carefully cleaned ¼ inch thick glass plate that is dip-coated with 0.3 micron of high resolution photoresist material 70 that becomes selectively soluble or insoluble when exposed to light energy. One such material is available through the Shipley Company of Newton, Mass. and is marketed under the name AZ–1350 Photo Resist. The thickness variation of the coating is kept below ±100 angstrom units by using a hydraulically controlled dip coating apparatus that is isolated from vibrations and is protected from conductive air currents. The plate is prepared in a "clean room" to eliminate dust.

The coated plate is then exposed to a pattern of illumination generated by interfering two coherent diverging light beams from a continuous wave laser that operates in the blue-violet or ultraviolet range in the manner described above. The light pattern produced at the coated surface consists of alternate light and dark fringes having a sinusoidal profile. It has been found that the fringe lines can be held parallel to within 3 minutes of arc when measured over a 9 inch x 9 inch plate when the plate is positioned about six feet from the optical lenses as shown in FIG. 1. The line to line spacing is determined by the approximate relationship:

$$X=\left(\frac{D}{d}\right)$$

where:

$\lambda$=the output wavelength of the illumination source,

D=the optical distance between either lens and the working surface of the grating, and $d$=the optical distance between the two lenses.

By changing either D or $d$, the fringe line spacing can be easily varied between 1 and 10 microns which would correspond to a spatial frequency of 100 to 1000 lines per millimeter.

Control plates 35 and 36 are moved through a predetermined path of travel whereby the interference fringe pattern is scanned in the read-out plane to produce a time average exposure of the illumination pattern over the entire optical working surface of the grating. To achieve these results, the individual plates are periodically repositioned in the respective entering light beams by means of a reversible stepping motor 54, 55 operatively associated therewith. The stepping function of each motor is regulated by phase generators 52, 53, respectively, whose operation is governed by computer means 51. The computer output is programmed to regulate the movement of the control plates whereby a uniform time average exposure of the illumination pattern is obtained on the read-out plane. Although, in this particular case, the instantaneous intensity pattern is Gaussian in shape, it should be apparent to those skilled in the art that the particular apparatus herein disclosed is capable of producing a uniform time average exposure in a read-out plane regardless of the energy distribution of the original input beam.

Figure 3:
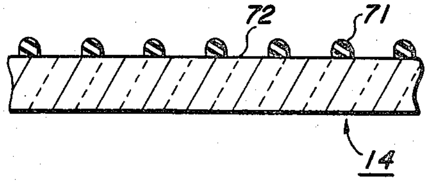
FIG. 3 is an enlarged partial sectional view through the work elements shown in FIG. 1 after development of the photosensitive coating thereon illustrating the formation of periodic ridges thereon.

When utilizing a laser light source having a 200 milliwatt output and operating at about $\gamma$=4579 angstroms, an exposure time in the order of approximately 1 hour is required to insure proper development of the photoresist coating material on a 9" by 9" surface. After exposure, the coated glass plate is removed from the exposure station and placed in a spray development station. Here, an atomized spray of photoresistive developer solution, also available through the Shipley Company under the name AZ Developer, is directed at the imaged working surface of the grating. A sufficient quantity of developer is sprayed into contact with the coated surface to insure that the photosensitive material is developed in the exposed areas at a predetermined desired rate. Typically, complete removal of the exposed photosensitive material from the element is accomplished in about 30 seconds when the surface is sprayed with developer at a temperature of approximately 57° F. Development is then quickly stopped by flushing the coated working surface of the grating with distilled water. As illustrated in FIG. 3, the developed grating 14 is composed of a periodic array of parallel glass lines positioned between ridges 71 of photoresistive material with the glass lines 72 extending across the entire working surface of the plate.

Figure 4:
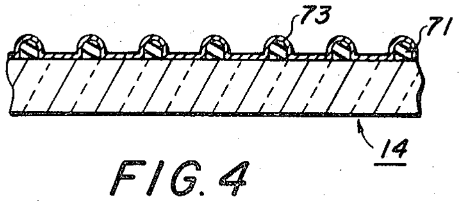
FIG. 4 is an enlarged partial sectional view through the work element showing a thin layer of metal placed over the developed surface of the element.

The surface of the master is now prepared for replication. For example, the developed plate can be coated with a thin layer of glass adhering metal 73 (FIG. 4), such as chromium or the like, using well known vacuum deposition techniques. A high degree of deposition uniformity is achieved during this step by optimizing the evaporator geometry so that a thin layer of about 150 angstroms thick is deposited over the ridge bearing surface. The coating layer follows the contour of the surface consisting of flat glass spaces and photoresist ridges to provide a smooth surface to cast against.

Figure 5:
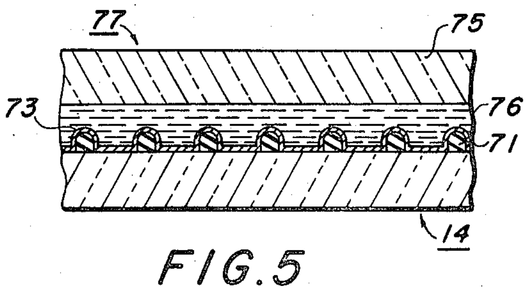
FIG. 5 is an enlarged partial sectional view illustrating the formation of an inverse replica of the metal coated work element shown in FIG. 4.

The plate is now in a condition to be used as a master from which an inverse replica can be formed to produce an X-ray grating. A glass or metal substrate 75 (FIG. 5) is coated with an epoxy resin 76 and the resin coated plate 77 cemented to the master. Any epoxy resin capable of being cast against the master to form a replica thereof that is free of bubbles and voids can be used. Pressure is applied to the sandwich and the resin allowed to dry or harden in contact with the metallized surface of the master. During drying, sufficient pressure is applied between the two coacting elements to force surplus resin from therebetween and to insure that the resin is held in intimate contact with the master. Upon hardening, the master and the backing substrate are separated. The resin coated substrate now bears an inverse replica of the master that is made up of extremely flat strips derived from the optically flat glass surface of the master and being separated by grooves derived from the ridges of photoresistive material superimposed therebetween.

Although epoxy resin coated glass element constitutes a finished X-ray grating, it may be desirous to coat the grating with a metal or the like to further insure that a substantially flat unblemished working surface is obtained and to enhance the reflective quality of the finished product. Similarly the substrate material need not be limited to glass, and any castable material capable of setting in contact with the master to produce a smooth unblemished working surface may be used in place of the epoxy resin herein disclosed. Although the present invention has been described with reference to structures disclosed herein, it is not necessarily confined to the details as set forth, and this application is intended to cover such modifications or changes as may come within the purposes or scope of the following claim.

What is claimed is:

1. A method of producing a diffraction grating on a format having an extended area, including the steps of:

dividing a source beam of coherent light from an illumination source into first and second component beams, having a first cross-sectional area, said first cross-sectional area being smaller than said extended area, directing said first and second component beams through lenses to establish spherical wavefronts in said component beams, recombining said component beams at an included angle on a support element having a surface of photoresist material in the plane of said format to interfere with each other and thus to create an interference pattern having light and dark fringes, rotating a Snell plate about first and second axes of rotation to effect two-dimensional lateral displacement of said source beam and corresponding two dimensional displacement of said interference pattern on said photosensitive surface, the fringes of said interference pattern remaining stationary during such displacement, whereby said interference pattern is spread over said surface of photoresist material covering an area thereof larger than said first cross-sectional area of said component beams, developing the exposed photoresist material to remove portions thereof leaving alternate covered and uncovered portions of said support element.

coating the developed surface of the support element with an adhering metal to produce a metal surface having a contour of parallel fringes corresponding to those in the support element surface, and coating a replication material against the contoured metal surface and removing the same, thereby producing a diffraction grating.

References Cited

UNITED STATES PATENTS

| | | | |
|---|---|---|---|
| 3,388,735 | 6/1968 | Sayce | 96—38.3 |
| 3,524,394 | 8/1970 | Sunners | 350—285 |
| 1,744,642 | 1/1930 | Kondo | 96—38.3 |
| 3,650,604 | 3/1972 | Little | 350—3.5 X |
| 3,650,605 | 3/1972 | Little | 350—3.5 X |

FOREIGN PATENTS

| | | | |
|---|---|---|---|
| 1,094,484 | 12/1960 | Germany | 96—38.3 |
| 817,051 | 7/1959 | Great Britain. | |
| 18,210 | 1902 | Great Britain | 264—219 |

OTHER REFERENCES

Pennington, K. S.: How To Make Laser Holograms, Microwaves, October 1965, pp. 35–40.

DAVID KLEIN, Primary Examiner

U.S. Cl. X.R.

96—38.3; 350—285, 3.5; 264—1